United States Patent

[11] 3,600,877

| [72] | Inventors | Donald E. McCrary;<br>James J. Lee, both of Rte. 1, Venus, Tex. 76084 |
|---|---|---|
| [21] | Appl. No. | 821,225 |
| [22] | Filed | May 2, 1969 |
| [45] | Patented | Aug. 24, 1971 |

[54] STRIPPING-SHREDDING METHOD AND APPARATUS
2 Claims, 6 Drawing Figs.

[52] U.S. Cl. .................................................. 56/10.3,
60/30, 192/56, 56/13.7
[51] Int. Cl. ............................................................. A01d 35/26
[50] Field of Search.......................................... 56/6, 25.4,
503; 60/28, 30; 192/54, 55, 56

[56] References Cited
UNITED STATES PATENTS

| 779,965 | 1/1905 | Purnell ......................... | 56/11 |
| 1,879,823 | 9/1932 | Ray ............................. | 56/11 |
| 2,509,970 | 5/1950 | Edmonds...................... | 56/30 |
| 2,940,283 | 6/1960 | Christenson et al. .......... | 64/30 |
| 3,100,974 | 8/1963 | Wilson et al. ................. | 64/30 |
| 3,122,903 | 3/1964 | Ramsden...................... | 64/30 |
| 3,450,211 | 6/1969 | Becker et al.................. | 56/25.4 X |
| 3,452,530 | 7/1969 | Kulak .......................... | 56/503 |

*Primary Examiner*—Russell R. Kinsey
*Attorneys*—James F. Weiler, Jefferson D. Giller, William A. Stout, Paul L. De Verter, II, Dudley R. Dobie, Jr. and Henry W. Hope ABSTRACT: A method for harvesting an agricultural product such as cotton by removing the product from its plant and concurrently shredding the plant. A shredding apparatus is provided to be supported and driven by harvesting machinery and comprises a housing for attachment to the harvesting machinery, upright shafts journaled in the housing for rotative movement, a blade secured to the lower end of each upright shaft, a drive shaft journaled to the housing for rotation by the harvesting machinery, gear means transmitting rotative movement from the drive shaft to each upright shaft and clutch means operatively engaged between the drive shaft and each upright shaft.

PATENTED AUG 24 1971
3,600,877
SHEET 1 OF 2
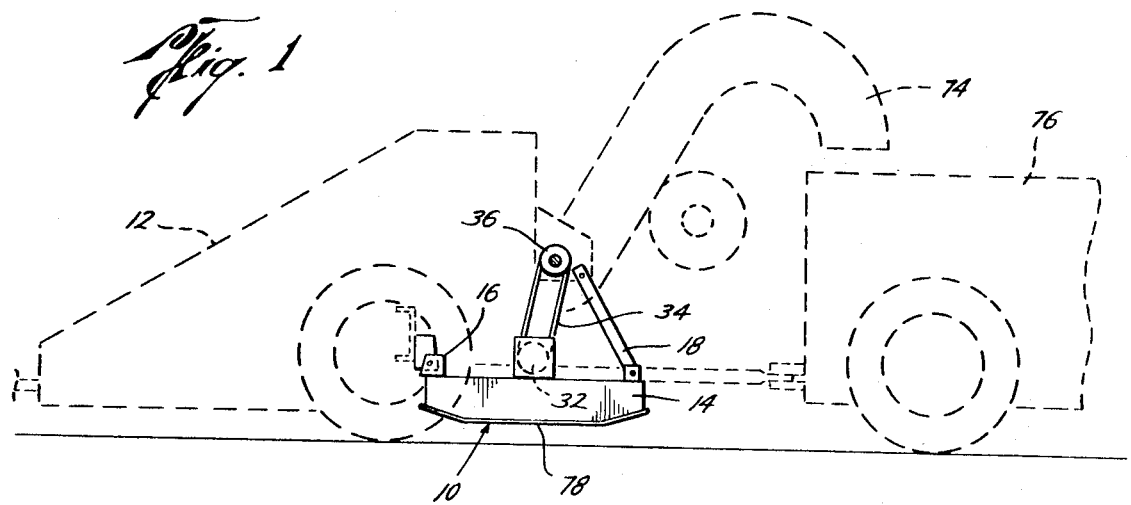
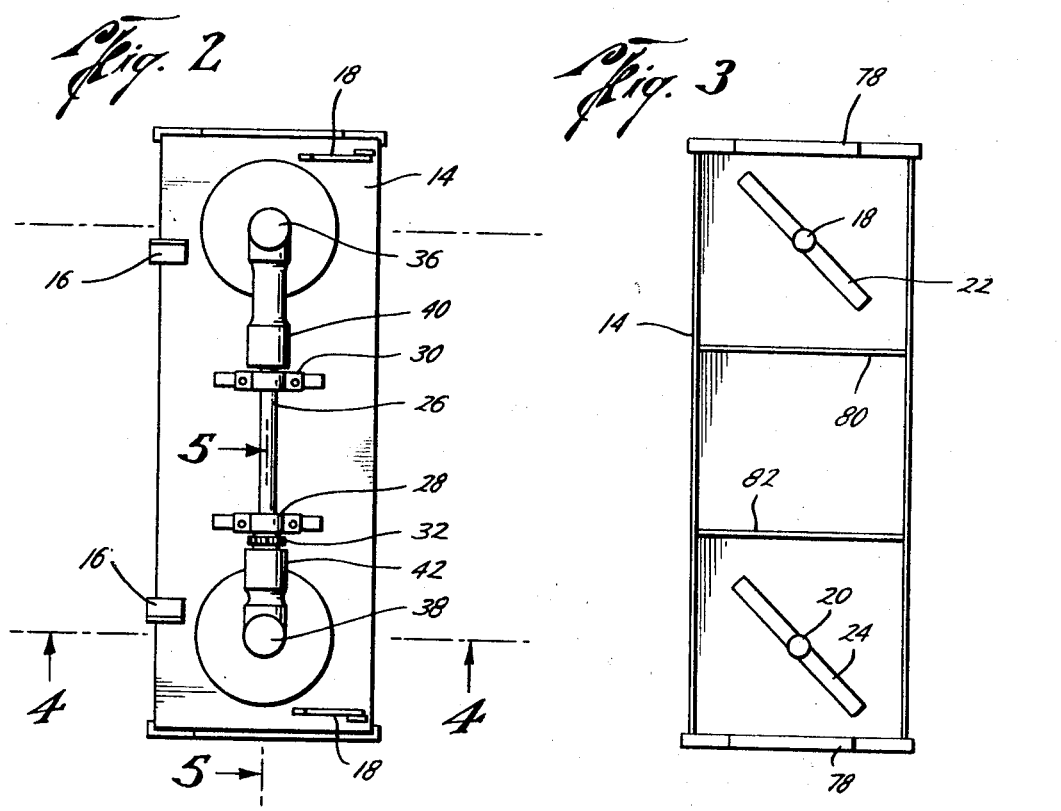
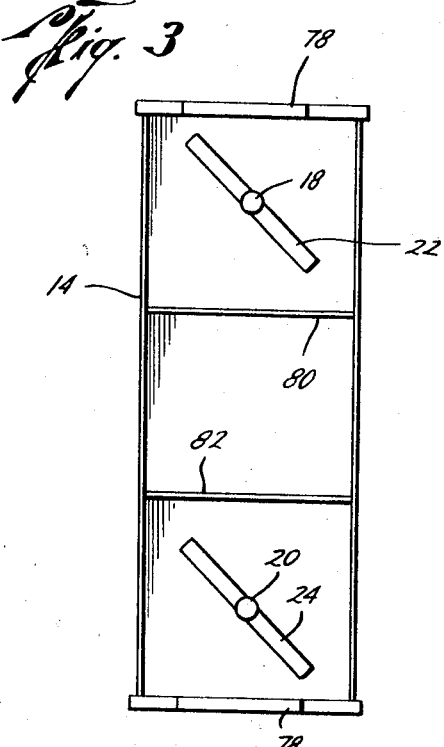
Donald E. McCrary
James J. Lee
INVENTORS
BY
ATTORNEYS Donald E. McCrary
James J. Lee
INVENTORS

BY

ATTORNEYS

3,600,877

STRIPPING-SHREDDING METHOD AND APPARATUS

BACKGROUND OF THE INVENTION

Conventional practice in the mechanical harvesting of cotton and other agricultural products and subsequent field conditioning generally includes the steps of making at least one pass over the cotton field for purposes of picking or stripping the bolls of cotton from the plants. After the harvesting operation, a conventional tractor-drawn shredder device passes over the field shredding or comminuting the stalks and branches of the plants. Then the field is plowed and the shredded material generally turned under or otherwise mixed with the soil to permit further use of the field for agricultural purposes.

The independent harvesting and shredding operations frequently create problems in that shredding often is delayed by weather conditions and, if not carried out soon enough, hampers the control of pests such as pink bollworms, boll weevils and other insects. Other problems arise in the independent harvesting and shredding steps such as packing of the soil by multiple passes of machinery over the field; added labor and fuel costs as well as wear and tear on the machinery due to separate passes of equipment over the field; and additional problems as have long been experienced by those in the farming industry. The present invention provides a method and apparatus that are directed to the elimination of these problems as will be explained.

SUMMARY OF THE INVENTION

The present invention generally provides a method for mechanically harvesting an agricultural product such as cotton from a field of plants and concurrently shredding the stalks and branches of the plants by contact with rotary cutting means secured to and powered by the mechanical harvesting means. The rotary cutting means includes a housing for attachment to the mechanical harvesting machinery, upright shafts journaled in the housing and each having a blade at the lower end thereof, a drive shaft also journaled to the housing to be rotated by the harvesting machinery, and gear and clutch means between the drive shaft and the upright shafts.

The rotary cutting means is secured at the rear of the mechanical harvesting machinery, whether such harvesting machinery be a drag-type stripper, a mounted stripper, a self-propelled stripper or a self-propelled picker. As the harvesting machinery passes over a field, the agricultural product such as cotton is picked from the plants and the rotary cutting means at the same time shreds the remaining branches and stalks of the plants. Thus the harvesting and shredding machinery pass over the field in a single unitary pass as compared with multiple independent passes of conventional separate equipment.

As indicated previously, the longer that the stalks remain in a field after the plants have been picked, the more chance there is for infestation of the field by pests. In fact, agricultural regulations impose a deadline on cutting of stalks such as cotton stalks in order to prevent the breeding and hibernation of the pests. As can be appreciated, inclement weather conditions after harvesting can delay or even prevent shredding conventionally whereas the method and apparatus of the present invention obviate any such problem. Additionally, the method and apparatus of the present invention reduce wear and tear on farm machinery such as tractors, reduce oil and fuel consumption, provide a better conditioned soil since less packing occurs as compared with the situation when heavy equipment otherwise makes frequent passes over the soil; permits earlier plowing for preparation of the land after harvesting which in turn may mean earlier planting of later crops; reduce labor requirements, labor often being critical in many areas; and generally reduce equipment (such as tractors) inventory requirements.

It is, therefore, an object of the present invention to provide a method for harvesting an agricultural product such as cotton from a field of plants by passing mechanical harvesting means among the plants and concurrently shredding stalks and branches of the plants.

Another object of the present invention is the provision of an improved rotary stalk cutter supported and driven by conventional harvesting machinery whereby shredding of the plants immediately after harvesting is accomplished with only one pass of the unitized equipment through a field as compared with multiple independent passes of heavy equipment in conventional operations.

A further object of the present invention is the provision of such an improved rotary stalk cutter device having a housing, rotatable blades within the housing, a drive shaft for rotating the blades, and gear and clutch means for transmitting rotary motion from the drive shaft to each blade.

Other and further objects, features and advantages will be apparent from the following description of a presently preferred embodiment of the invention, given for the purpose of disclosure and taken in conjunction with the accompanying drawings, wherein like character references designate like parts throughout the several views, and where:

FIG. 1 is a side elevational view of the improved rotary cutter device of the present invention shown secured to mechanical harvesting machinery, FIG. 2 is a plan view illustrating the rotary cutter device, FIG. 3 is a bottom view of the blade and housing means of the cutter, FIG. 4 is a cross-sectional side view taken along line 4—4 of FIG. 2, FIG. 5 is a partial view partly in cross section showing the clutch means of the cutter device, and FIG. 6 is a view taken along the line 6—6 of FIG. 5 and showing the clutch means in relation to the drive shaft of the rotary cutter.

DESCRIPTION OF THE PREFERRED EMBODIMENT

Figure 5:
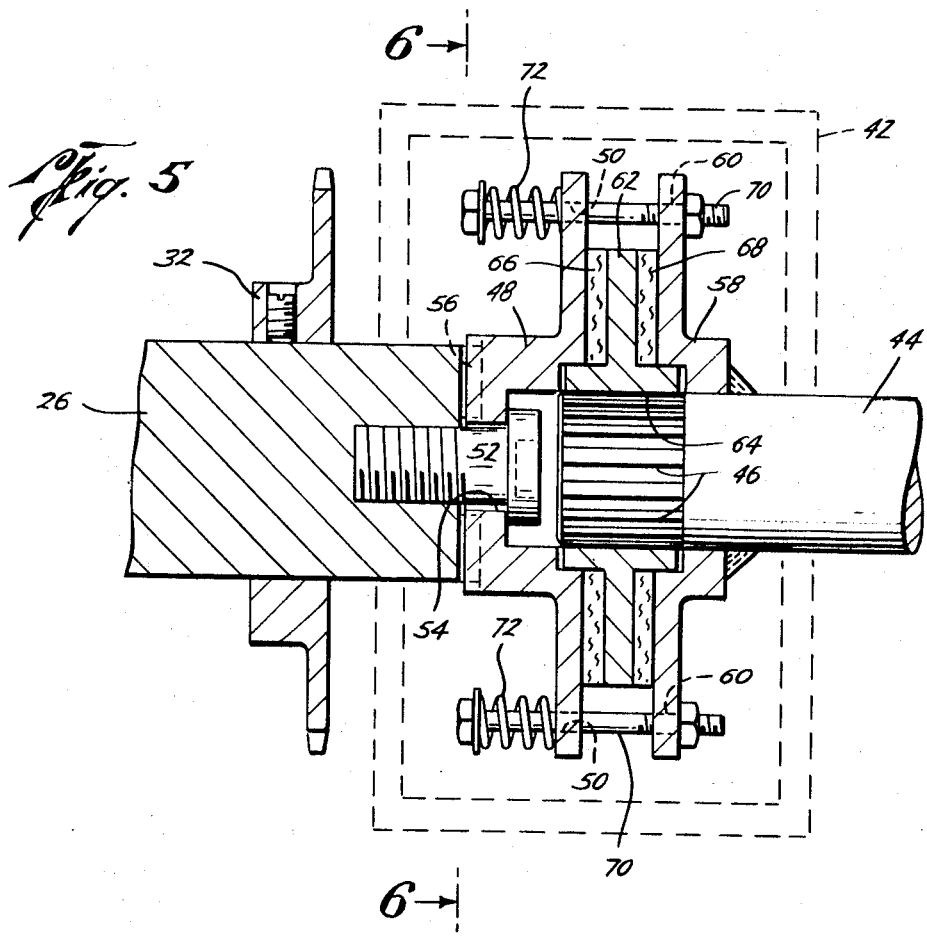

The improved rotary stalk cutter device of the present invention is designated by the reference numeral 10 in FIG. 1 and is shown secured to and powered by a mechanical harvesting device 12. The mechanical harvesting device 12 may be a conventional drag-type stripper, a self-propelled stripper, a self-propelled cotton picker or the like.

With reference to FIGS. 1–4, the rotary stalk cutter 10 comprises a housing 14 having front connecting members 16 and rear connecting members 18 secured to and extending from the housing for attachment to the harvesting device 12.

As best shown in FIGS. 3 and 4, upright shafts 18 and 20 are journaled in the housing for rotative movement relative thereto and have blades 22 and 24 respectively secured to the lower end of each shaft.

As shown in FIG. 2, a drive shaft 26 is journaled to the housing by means of pillow blocks 28 and 30 and is provided with a sprocket gear 32. As shown in FIG. 1, an endless chain 34 engages the sprocket 32 as well as a power takeoff sprocket 36 on the harvesting device 12 so that the drive shaft 26 may be rotated and driven by the harvesting device.

With reference to FIG. 2 and partially to FIG. 4, gear means 36 and 38 are provided between the drive shaft 26 and the upright shafts 18 and 20 respectively for purposes of transmitting rotative movement from the drive shaft 26 to the upright shafts. The gear means 36 and 38 each includes suitable gearing such as pairs of bevel gears wherein in each pair one bevel gear is secured to one end of the drive shaft 26 to mesh with the other bevel gear which is secured to the upper end of the upright shafts (18 and 20).

As further shown in FIG. 2, clutch means 40 and 42 operatively engage between the drive shaft 26 and each of the upright shafts 18 and 20 respectively, both clutch means being disengageable to interrupt rotative movement of each of the upright shafts 18 and 20 respectively. The clutch means 42 is shown in more detail in FIGS. 5 and 6 and it is to be understood that the representation of FIGS. 5 and 6 is equally applicable to the clutch means 40.

Figure 6:
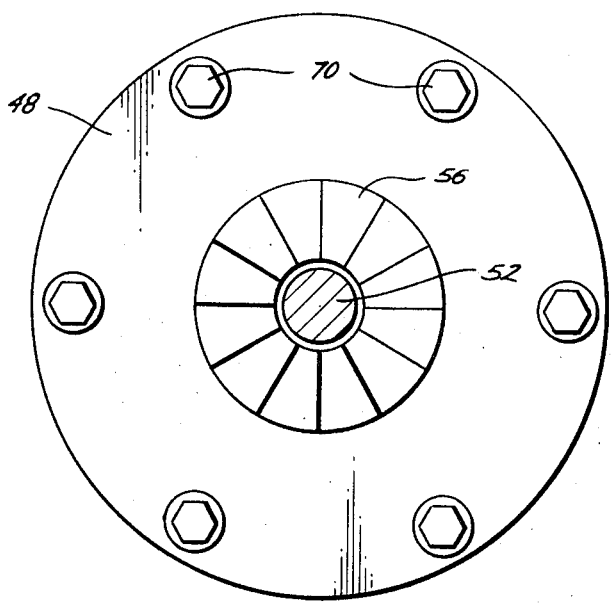

Referring now to FIG. 5 for explanation of the clutch means 42, a splined shaft or shaft 44 having axial splines 46 at the outer end thereof is in effect an extension of the drive shaft 26, the portion 44 extending from the gear box 38 (as shown in FIG. 2). Secured to the drive shaft 26 is a first plate member 48 having a plurality of spaced holes 50 adjacent the outer periphery thereof. The plate member 48 is secured to the drive shaft 26 by means of a bolt 52 passing through a bore 54 within the plate to threadably engage the drive shaft and rotates as a unit with the drive shaft 26 by virtue of interlocking teeth 56 on both of the drive shaft and the plate member. Alternatively, the plate 48 may be welded or otherwise secured to the drive shaft in a suitable manner.

Continuing with respect to FIG. 5, a second plate 58 is slidably (axially as well as circumferentially) positioned about the splined shaft 44 and is provided with a plurality of spaced holes 60 adjacent its outer periphery. A third plate member 62 is provided between the first and second plates 48 and 58 respectively and has an axial bore 64, the walls of the bore 64 being splined so as to mesh in axial slidable engagement with the splines 46 of the shaft 44. Clutch plate discs 66 and 68 formed of suitable friction clutch material are positioned on either side of the third plate member 62 and between the first and second plate members 48 and 58. The surfaces of each of the first, second and third plate members adjacent the clutch discs 66 and 68 likewise are formed into suitable friction or clutch surfaces so that each of the plate and clutch discs members may engage as shown in FIG. 5 and rotate as a unit. Such unitary engagement is provided by a plurality of bolts 70 connecting the first and second plate members 48 and 58 by engaging through the holes 50 and 60 respectively of such plate members. At one end of each bolt 70 is a compression spring 72 which biases the first and second plate members 48 and 58 respectively toward each other thereby maintaining the plates 48, 58 and 62 in engagement with the clutch discs 66 and 68 as shown in FIG. 5. As long as such unitary engagement is maintained, the splined shaft 44 rotates at the same speed as the drive shaft 26. However, the springs 72 will yield to excessive torque imparted to the splined shaft 44 by the drive shaft 26 whereby the second plate member 58 can move away from the first plate in turn allowing the third plate member 62 to move away from the first plate 48 and freeing the clutch discs 66 and 68 from engagement with each of said plate members. When such disengagement occurs, the shaft 44 is no longer operatively connected to the drive shaft 26 thereby interrupting rotative movement of the blade 24 as shown in FIG. 4.

In operation, the rotary stalk cutter device assembled as just discussed is secured to a harvesting device 12 as shown in FIG. 1, the particular harvesting device shown being a drag-type cotton stripper pulled by a tractor. The blades 22 and 24 of the stalk cutter device as shown in FIG. 3 are rotated by means of power received from the sprocket 36 on the harvester, such power being transmitted through the chain 34 to the sprocket 32 to drive the drive shaft 26 as shown in FIG. 2. As the harvester 12 proceeds through a cotton field while being drawn by a tractor, the bolls of cotton are harvested and pass by means of a conduit 74 to a trailer 76 secured to the harvester. The stalk cutter device 10 is positioned rearward of the harvester 12 so that as the cotton is picked, the branches and stalks of the cotton plants are shredded to be plowed under.

Should either of the blades 22 or 24 as shown in FIG. 3 encounter some impediment to rotation thereof, rotation is terminated or interrupted by buildup of torque between the drive shaft 26 and the splined shaft 44 of FIG. 5. As a result, tension in the springs 72 is overcome and the plate 58 within the clutch means (42 as shown in FIG. 5) slides on the shaft 44 to permit the clutch discs 66 and 68 to become disengaged from any of the plates 48, 58, or 62 and thereby permit the shaft 44 to rotate freely relative to the drive shaft 26.

It is preferred that the stalk cutter device 10 be provided with downwardly extending skids 78 on either end of the housing so that any projections from the ground will first strike such skids. Also, the connecting members 16 and 18 as shown in FIG. 1 are preferably pivotal in their connections so that when objects strike the skids 78 the entire cutter device 10 is pushed upward thereby lessening the chance of damage to either of the whirling blades 22 or 24.

As shown in FIG. 3, partitions 80 and 82 are secured within the housing adjacent the blades so that the plant material being shredded will remain in close proximity to the blades until sufficiently comminuted to pass from within the housing.

Thus, as will be appreciated, the rotary stalk cutter device 10 of the present invention in combination with a mechanical harvester permits the simultaneous harvesting and shredding of agricultural products and particularly cotton from a field of plants. The combined harvesting and shredding operation effects savings i5 labor, machinery and operational costs as well as permitting immediate plowing with consequent benefits mentioned previously. At the same time, the stalk cutter apparatus as shown in FIG. 1 is situated in a remote position from a tractor pulling the harvester 12 and the harvester 12 acts as a shield to prevent the rotary blades of the stalk cutter 10 from impelling flying objects toward the tractor driver. The present invention thus provides an added safety feature to an otherwise risky farming operation.

The present invention, therefore, is well adapted to carry out the objects and attain the ends and advantages mentioned as well as others inherent therein.

What is claimed is:

1. An improved rotary stalk cutter adapted to be supported and driven by harvesting machinery, comprising
    a. a housing,
    b. pivotal connecting members secured to and extending from the housing for attachment to the harvesting machinery,
    c. a plurality of upright shafts journaled in said housing for rotative movement,
    d. a blade secured to the lower end of each of said upright shafts,
    e. a drive shaft journaled to the housing to be rotated by the harvesting machinery,
    f. a gear means between the drive shaft and each upright shaft transmitting rotative movement from the drive shaft to each upright shaft, said gear means having a splined shaft extending therefrom, and
    g. a clutch means operatively engaged between the drive shaft and each upright shaft but disengageable to interrupt rotative movement of each upright shaft, said clutch means including,
        a first plate secured to the drive shaft and having a plurality of spaced holes adjacent the periphery thereof,
        a second plate slidable about the splined shaft extending from the gear means, said plate having a plurality of spaced holes adjacent the periphery thereof,
        a third plate between the first and second plates having an axial, splined bore engaging the splines of the splined shaft extending from the gear means and being axially slidable thereon,
        clutch discs on either side of the third plate, and
        bolt and spring means engaging the holes of the first and second plates and releasably maintaining said plates in engagement with the clutch discs to in turn maintain the clutch discs in engagement with the third plate.

2. The rotary stalk cutter of claim 1 including, additionally, runner members secured below the housing.